(12) United States Patent  
Meilhac et al.

(10) Patent No.: US 7,539,167 B2  
(45) Date of Patent: May 26, 2009

(54) SPREAD SPECTRUM RECEIVER AND METHOD FOR CARRIER FREQUENCY OFFSET COMPENSATION IN SUCH A SPREAD SPECTRUM RECEIVER

(75) Inventors: Lisa Meilhac, St Laurent du Var (FR); Jonathan Adlard, Sheffield (GB)

(73) Assignee: NewLogic Technologies GmbH, Lustenau (AT)

( * ) Notice: Subject to any disclaimer, the term of this patent is extended or adjusted under 35 U.S.C. 154(b) by 551 days.

(21) Appl. No.: 11/326,001

(22) Filed: Jan. 5, 2006

(65) Prior Publication Data

US 2006/0171361 A1 Aug. 3, 2006

(30) Foreign Application Priority Data

Jan. 13, 2005 (DE) ........................ 10 2005 001 696

(51) Int. Cl.
*H04B 7/216* (2006.01)
*H04J 3/06* (2006.01)
*H04B 1/00* (2006.01)

(52) U.S. Cl. ....................... 370/335; 370/342; 370/516; 375/136

(58) Field of Classification Search ................. 370/335, 370/342, 516; 455/126; 375/136
See application file for complete search history.

(56) References Cited

U.S. PATENT DOCUMENTS

2004/0208263 A1* 10/2004 Rives et al. ................. 375/327

2005/0057289 A1* 3/2005 Pham .......................... 327/156

OTHER PUBLICATIONS

Mengali, U et al.: "Synchronization Techniques for Digital Receivers", New York, London, Plenum Press, 1997, Dec. 1997.

* cited by examiner

*Primary Examiner*—Barry W Taylor
(74) *Attorney, Agent, or Firm*—Baker & Daniels LLP

(57) ABSTRACT

The invention relates to a spread spectrum receiver for receiving and decoding an input signal r(k) consisting of a sequence of chips and a method for carrier frequency offset compensation in such a spread spectrum receiver. The receiver comprises a correlator for processing the input signal r(k) and providing at its output a signal y(n) which consists of a sequence of symbols; a phase rotator, coupled to an output of the correlator, for rotating the phase of the signal y(n) based on a filtered phase error signal θ(n) in order to compensate a carrier frequency offset Ω contained in the input signal r(k); a detector, coupled to an output of the phase rotator, for receiving the rotated signal z(n) and for taking a decision on the symbols and providing an output signal c(n) which is subsequently demapped to a sequence of bits; an error signal generator, coupled to the outputs of the phase rotator and the detector, for generating a phase error signal e(n) which depends on the carrier frequency offset of the input signal r(k); and a loop filter, coupled to an output of the error signal generator, for filtering the phase error signal e(n) and feeding the filtered phase error signal θ(n) to the phase rotator.

14 Claims, 3 Drawing Sheets

SPREAD SPECTRUM RECEIVER AND METHOD FOR CARRIER FREQUENCY OFFSET COMPENSATION IN SUCH A SPREAD SPECTRUM RECEIVER

FIELD OF THE INVENTION

The present invention relates to a spread spectrum receiver and a method for carrier frequency offset compensation in such a spread spectrum receiver. In particular the invention relates to Wireless LAN spread spectrum receivers according to 802.11b standard.

STATE OF THE ART

The transmission in present WLAN systems uses a direct sequence (spread spectrum) modulation as the one described in the 802.11b standard.

FIG. 1 shows a simplified block diagram of a typical spread spectrum transmitter. In this kind of modulation systems, in a symbol mapping block 1 the data bits to be transmitted are mapped to a sequence of modulated symbols s(n) having a symbol time period Tn. The signal s(n) is modulated, for instance BPSK, QPSK. In a code selection block 2, to each symbol a particular code is associated from a finite set of codes. Code selection is a kind of coding/spreading technique which increases the robustness of the system to noise by allowing a processing gain. In the 802.11b standard there are two different methods of spreading: Direct Sequence Spread Spectrum (DSSS) with a Barker spreading sequence (code) and Complementary Code Keying (CCK). Generally, each code is composed of several chips. The sequence of symbols s(n) is converted to a sequence of chips t(k) having a period Tk, with Tk<Tn. In the 802.11 standard. Tk=Tn/11 and k=11*n. Then, in a signal shaping block 3 the signal t(k) is shaped, e.g. low pass filtered, and converted to an analog signal u(t) which can be transmitted by a radio transmitter block 4.

In CCK, at the transmitting side, bits are grouped by 8 to define a symbol among 256 possible. Then, a particular code of 8 complex chips (QPSK modulated) is associated to each symbol. Tk=Tn/8. At the reception side, the received chips are grouped by 8. Each group (of 8 chips) is correlated with the 256 existing codes. This means that the correlator has 256 outputs. This 256 outputs are then rotated. Finally, the detector selects one among the 256. The error generator is obtained from the output of the detector and the corresponding input (among the 256).

In the 11b standard, the sets of codes have been selected in order to have good autocorrelation properties and thus these codes can be efficiently decoded by correlation. A simplified block diagram typical spread spectrum receiver is presented in FIG. 2. A signal received by a radio receiver block 5 is converted into an analogue baseband signal v(t) and filtered in a filtering block 6. The resulting signal x(k) is input to a correlator 7 and decoded to a signal z(n). The correlator 7 includes the blocks for processing the received sequence of chips to recover the transmitted symbol. The decoded signal z(n) is input to a detector 8 and converted to a sequence of symbols c(n) which are fed to a demapping 9 block where they are demapped to the resulting sequence of bits. The detector receives the soft values of the correlator output, takes a decision on the transmitted symbol and convert the symbol to bits. Ideally, if there is no noise and no distortion in the radio transmitting path, the signal z(n) should approximately correspond the signal s(n) and thus the signal c(n) should be equal to s(n), i.e., z(n)≈s(n) and c(n)=s(n).

In practice due to the fact that the transmitter and the receiver have different carrier generation sources (crystal oscillators) which are non coherent there is produced a certain carrier frequency offset which represents the difference between the carrier frequency ($\xi$) of the transmitter and the carrier frequency ($\zeta$) of the receiver. This carrier frequency offset ($\omega=\xi-\zeta$) generates a continuous rotation of the phase of the received signal v(t) and the filtered signal x(k).

$$v(t) \approx u(t)\exp(i\omega t)$$

$$x(k) \approx t(k)\exp(i\Omega k)$$

In the art there are known several methods for carrier frequency offset compensation. FIG. 3 depicts a conventional phase rotation compensation system and its operation. To recover the received signal x(k), the receiver will estimate $\Omega k$ by using a phase rotation estimator 10 which produces an estimated phase rotation value $\theta(k)$. Based on this estimated phase rotation signal $\theta(k)$ a phase rotator 11 compensates the actual phase rotation $\Omega k$ to obtain the following processed signal:

$$y(k)=x(k)*\exp(i\theta(k)),$$

As long as $\theta(k)$ is an accurate estimate of $-\Omega k$, then y(k) will be an accurate estimate of the originally transmitted signal t(k).

FIG. 4 shows a carrier frequency offset compensation for systems with classical modulation. Here, we consider a conventional modulation, i.e., a sequence of symbols x(k) of period Tk which have been directly transmitted and received without the use of spread spectrum modulation. One efficient technique for compensating phase rotation in conventional modulation systems is to use a digital phase locked loop (PLL) which consists of an error signal generator 12, a loop filter 13 and the phase rotator 11. The error signal generator 12 produces an error signal e(k) that should be proportional to the difference between the current phase and the exact one, $$e(k) \approx \Omega k - \theta(k)$$

By filtering this error signal e(k) by the loop filter 13, the digital PLL produces a new phase estimate $\theta(k+1)$ that is compared to $\Omega(k+1)$. Gradually, the signal $\theta(k)$ is going to converge to $\Omega k$. Therefore, the digital PLL is able to track the phase rotation. The error signal can be directly derived from the output signal y (k) of the phase rotator 11 (see FIG. 4).

Nevertheless, improved performance is obtained using a so-called "decision-directed" phase locked loop as shown in FIG. 5. In this example the error signal is based on symbol decisions. For this, the output signals y(k) and c(k) of the phase rotator 11 and the detector 8 are input to the error signal generator 12 which generates a phase error signal e(n).

The standard method to cope with frequency errors is to use a second order loop filter 13 containing an integrator which allows to track linear derivation. An example of 2nd order loop filter implementation is presented in FIG. 6. After some time for convergence, the second order loop will lock on the incoming carrier offset with no static error. The integrator branch of the loop filter which generates the $\psi(k)$ signal converges to the typical value of the difference between two successive phases, i.e. $\psi(k)$ converges to $\Omega$.

FIG. 7 shows an example for a digital phase locked loop for direct sequence modulation. As described previously, in direct sequence modulation systems, groups of data are mapped to groups of chips that must be decoded jointly using a correlator 7 between the phase rotator 11 and the detector 8. This can be achieved by using a classical decision directed PLL for DS systems. The issue is that the correlator 7 introduces an additional delay in the loop. But, the more delay is introduced in a PLL loop, the worse its performance will be and in particular its ability to converge rapidly. Many tests have shown that the classical solution shown in FIG. 7 is not able to converge for large carrier offset value as defined in the 802.11b standard (around 50 ppm).

DISCLOSURE OF THE INVENTION

It is the purpose of the invention to provide a spread spectrum receiver and a method for estimating the carrier frequency offset Ω and compensating the associated phase rotation to ensure an accurate correlation and detection in the spread spectrum receiver.

This object is achieved by providing a spread spectrum receiver and a carrier offset compensation method as described in the independent claims.

Other features which are considered to be characteristic for the invention are set forth in the appended claims.

The spread spectrum receiver for receiving and decoding an input signal r(k) consisting of a sequence of chips comprises a correlator for processing the input signal r(k) and providing at its output a signal y(n) which consists of a sequence of symbols; a phase rotator, coupled to an output of the correlator, for rotating the phase of the signal y(n) based on a filtered phase error signal θ(n) in order to compensate a carrier frequency offset Ω contained in the input signal r(k); a detector, coupled to an output of the phase rotator, for receiving the rotated signal z(n) and for taking a decision on the symbols and providing an output signal c(n) which is subsequently demapped to a sequence of bits; an error signal generator, coupled to the outputs of the phase rotator and the detector, for generating a phase error signal e(n) which depends on the carrier frequency offset of the input signal r(k); and a loop filter, coupled to an output of the error signal generator, for filtering the phase error signal e(n) and feeding the filtered phase error signal θ(n) to the phase rotator.

According to the invention, a first preferred embodiment is characterized in that the phase rotator is arranged after the correlator block, i.e., the received signal passes the correlator before it passes the phase rotator. By this measure the delay in the loop is reduced which improves the convergence performance of the loop, A further preferred embodiment of the invention is related to an additional phase pre-compensation block which comprises a phase pre-compensation estimator, a pre-compensation signal generator and a pre-compensation phase rotator. The principle of the pre-compensation block is to obtain an estimated value φ for the carrier-offset parameter Ω order to systematically compensate the most part of the offset and let the loop track the residual offset.

The receiver according to the present invention allows for an efficient carrier offset compensation in spread spectrum WLAN systems (e.g. according to 802.11b standard).

The receiver achieves a good performance. For example, the loss in the Packet Error Rate (PER) vs. the Signal to Noise Ratio (SNR) caused by the carrier-offset compensation is less than 0.1 dB for an offset of 50 ppm.

BRIEF DESCRIPTION OF THE DRAWINGS

A preferred embodiment of the receiver according to the present invention is now described with reference to the drawings.

DESCRIPTION OF A PREFERRED EMBODIMENT

Figure 8:
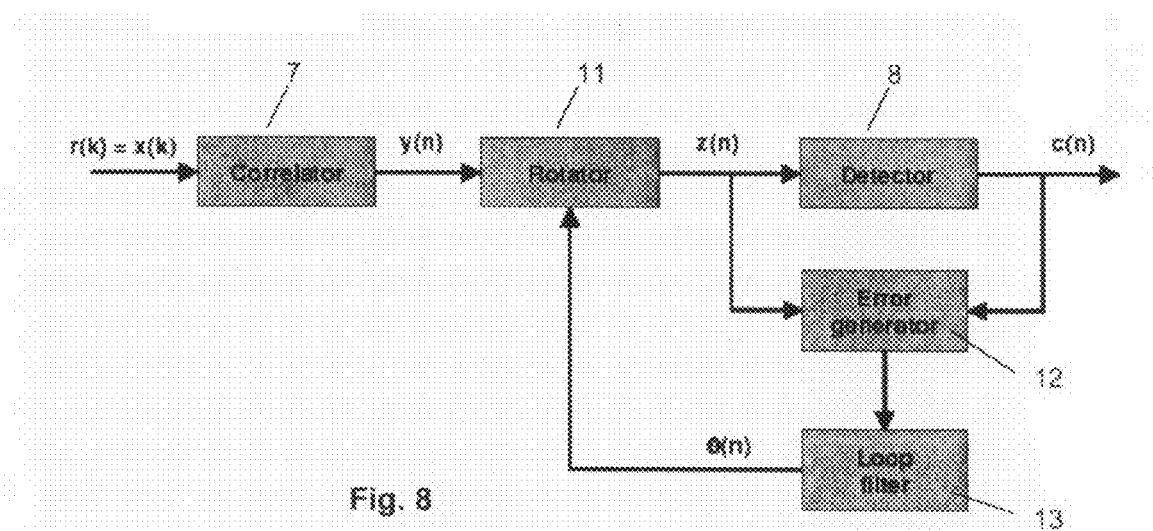
FIG. 8 is a block diagram of the basic layout of the carrier offset compensation system for DS modulation according to the invention.
Figure 9:
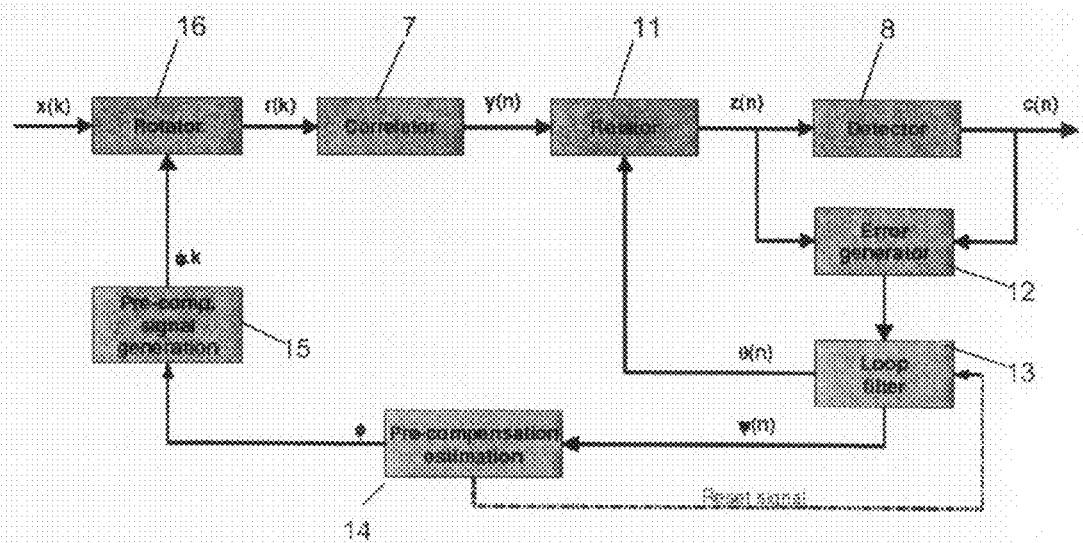
FIG. 9 is a block diagram of the carrier offset compensation system for DS modulation according to the invention.

According to the invention, a solution is proposed based on a symbol decision directed phase locked loop and a carrier offset pre-compensation block as depicted in FIGS. 8 and 9.

Figure 7:
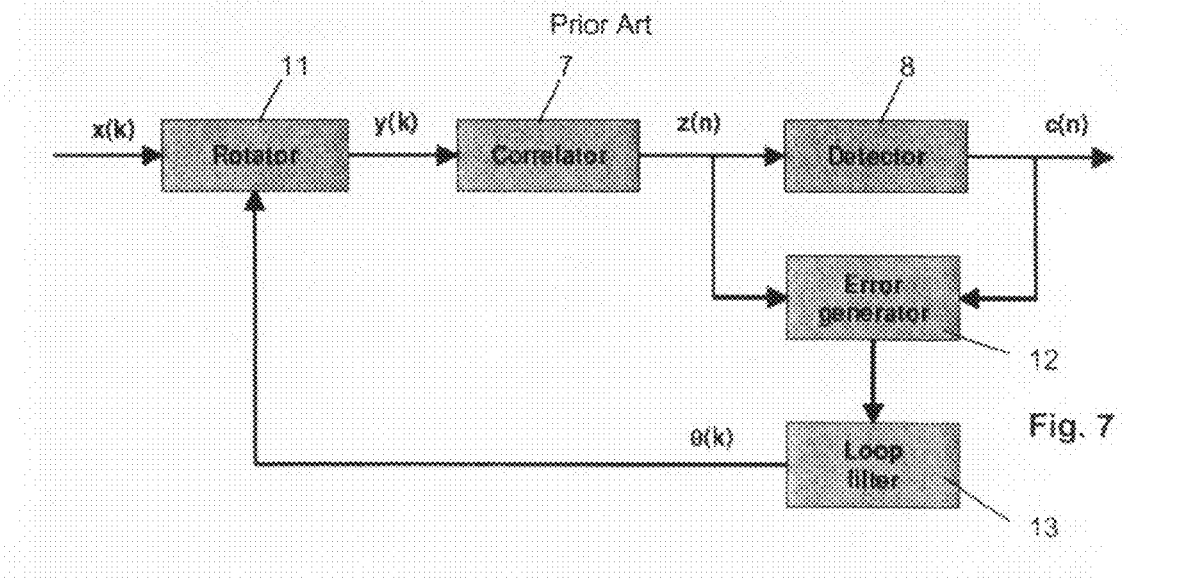
FIG. 7 is an example for a classical decision directed PLL for DS modulation.

With reference to FIG. 8 the improved receiver comprises generally the same functional blocks as a conventional receiver which is described in FIG. 7. To improve the convergence performance of the loop, as a first improvement according to the invention the phase rotator 11 is arranged after the correlator block 7, i.e., the received signal r(k) passes the correlator 7 before it passes the phase rotator 11 in order to reduce the delay in the loop.

Accordingly, the correlated signal y(n) is applied on a rotating signal so that a certain bias at the output of the correlator is introduced which may degrade the performance of the circuit. To reduce this bias to a negligible value, it is proposed to add a new functional block called phase pre-compensation block.

As depicted in FIG. 9, the phase pre-compensation block comprises a phase pre-compensation estimator 14, a pre-compensation signal generator 15 and a pre-compensation phase rotator 16.

The pre-compensation estimator 14 is coupled to the integrator output ψ(n) of the loop filter 13 and provides an estimate value φ for the carrier frequency offset Ω. The pre-compensation signal generator 15 is coupled to an output of the pre-compensation estimator 14 and generates a pre-compensation phase signal φ.k based on the estimate value φ. The pre-compensation phase rotator 16 receives a receiver signal x(k) and applies a phase rotation of the receiver signal x(k) based on the pre-compensation phase signal φ.k, in order to coarsely compensate the carrier frequency offset Ω contained in the receiver signal x(k).

The principle of the pre-compensation is to obtain an estimated value φ for the carrier-offset parameter Ω order to systematically compensate the most part of the offset and let the loop track the residual offset.

$$r(k) = x(k) * \exp(-i\phi k)$$

Thus, the rotation of the signal r(k) at the input of the correlator 7 is very slow producing a negligible bias.

Figure 1:
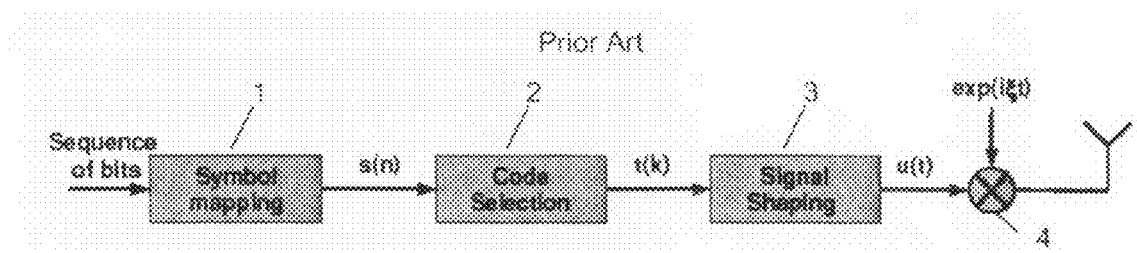
FIG. 1 is a simplified block diagram of a typical spread spectrum transmitter.
Figure 2:
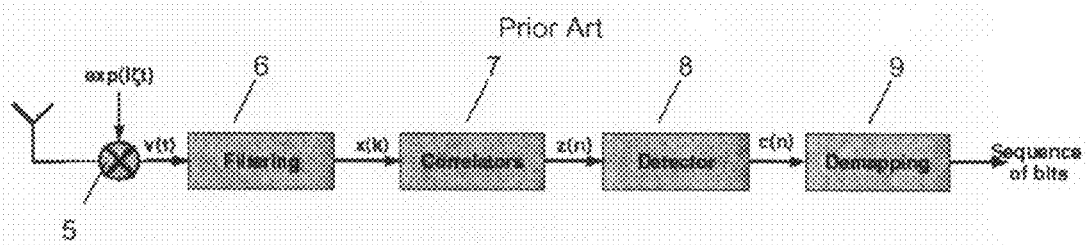
FIG. 2 is a simplified block diagram of a typical spread spectrum receiver.
Figure 3:
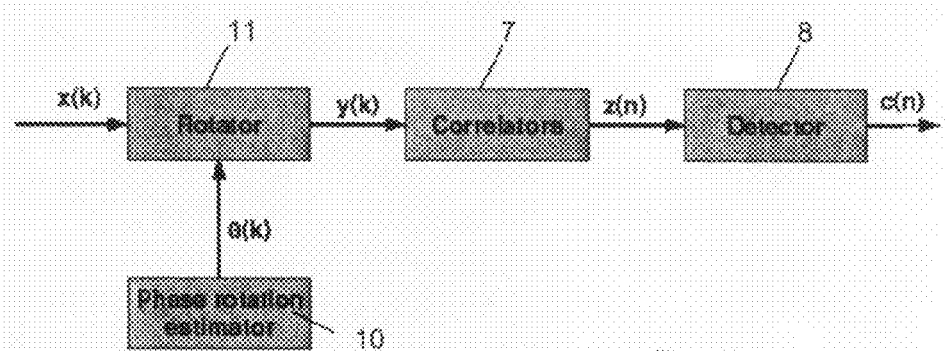
FIG. 3 is an example for a conventional carrier offset compensation system.
Figure 4:
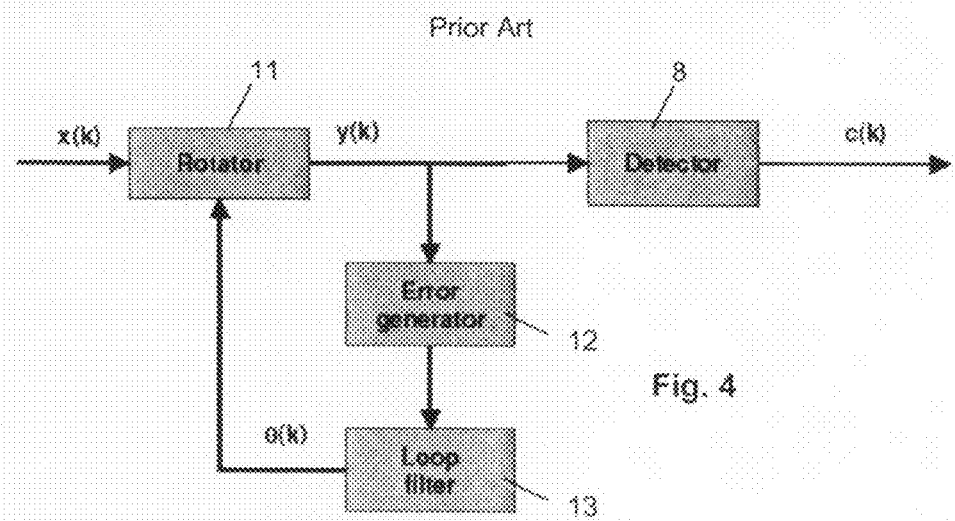
FIG. 4 is an example for a non-decision directed phase locked loop.
Figure 5:
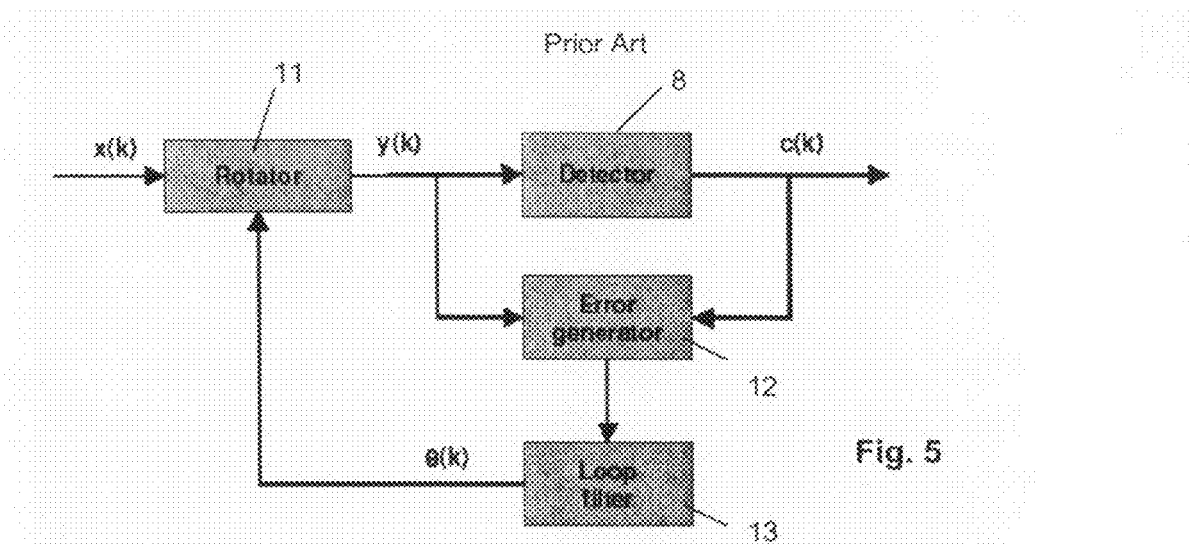
FIG. 5 is an example for a decision directed phase locked loop.
Figure 6:
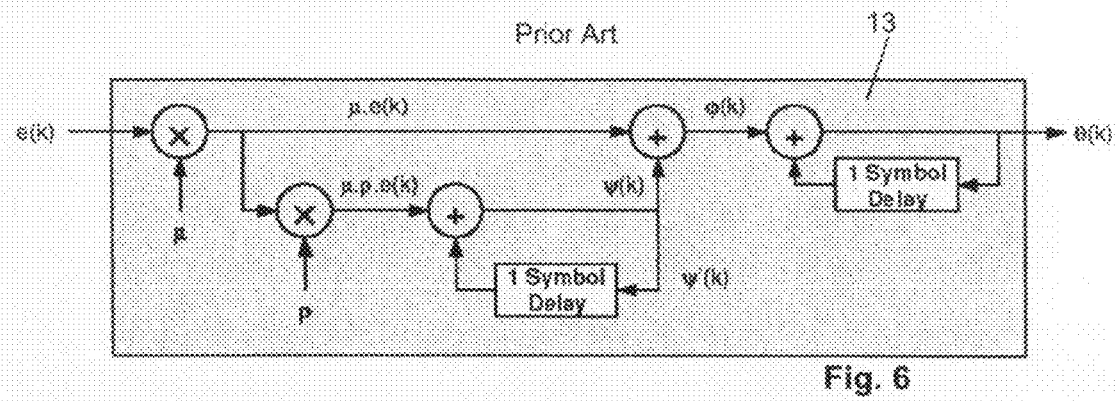
FIG. 6 is a block diagram of a PLL second order filter.

An estimate of Ω can be obtained from a number of methods. In the preferred embodiment, it is proposed to derive an estimate for Ω from the 2nd order loop filter 13. With reference to FIG. 6 it has already been explained that the signal ψ(k) in the integrator branch of the loop filter 13 converges to Ω.

So, the following procedure is proposed. At the beginning of the reception, the demodulation system presented in FIG. 8 is applied. At a given time Tp, defined such a way that the loop should have coarsely converged, the value of the signal $\psi(Tp)$ is stored in the value $\phi$. Then, the pre-compensation is applied as described in FIG. 9.

At the time when the pre-compensation is started to be applied, to make the work of the loop easier, the signal $\psi(k)$ stored in the loop is set to zero. For this, the pre-compensation estimator 14 generates a reset signal which is fed to a reset input of the loop filter 13 as to set the value $\psi(n)$ to zero.

LIST OF REFERENCE NUMERALS

1 Symbol mapping block
2 Code selection block
3 Signal shaping block
4 Radio transmitter block
5 Radio receiver block
6 Filtering block
7 Correlator
8 Detector
9 Demapping block
10 Phase rotation estimator
11 Phase rotator
12 Error signal generator
13 Loop filter
14 pre-compensation estimator
15 pre-compensation signal generator
16 pre-compensation phase rotator

The invention claimed is:

1. A spread spectrum receiver for receiving and decoding an input signal r(k) consisting of a sequence of chips, the receiver comprising:
a correlator for processing the input signal r(k) and providing at its output a signal y(n) which consists of a sequence of symbols;
a phase rotator, coupled to an output of the correlator, for rotating the phase of the signal y(n) based on a filtered phase error signal θ(n) in order to compensate a carrier frequency offset Ω contained in the input signal r(k);
a detector, coupled to an output of the phase rotator, for receiving the rotated signal z(n) and for taking a decision on the symbols and providing on an output an output signal c(n) which can subsequently be demapped to a sequence of bits,
an error signal generator, coupled to the outputs of the phase rotator and the detector, for generating a phase error signal e(n) which depends on the carrier frequency offset of the input signal r(k),
a loop filter, coupled to an output of the error signal generator, for filtering the phase error signal e(n) and feeding the filtered phase error signal θ(n) to the phase rotator, and
a phase pre-compensation block which comprises a phase pre-compensation estimator, a pre-compensation signal generator and a pre-compensation phase rotator.

2. A receiver according to claim 1, wherein the pre-compensation estimator is coupled to an output $\psi(n)$ of the loop filter and provides an estimate value $\phi$ for the carrier frequency offset Ω.

3. A receiver according to claim 2, wherein the pre-compensation signal generator is coupled to an output of the pre-compensation estimator-and generates a pre-compensation phase signal φ.k based on the estimate value φ.

4. A receiver according to claim 2, wherein the pre-compensation phase rotator is coupled to the pre-compensation signal generator and also receives a receiver signal x(k) and applies a phase rotation to the receiver signal x(k) based on the pre-compensation phase signal φ.k in order to coarsely compensate the carrier frequency offset Ω contained in the receiver signal x(k).

5. A receiver according to claim 1, wherein the pre-compensation signal generator is coupled to an output of the pre-compensation estimator and generates a pre-compensation phase signal φ.k based on the estimate value φ.

6. A receiver according to claim 5, wherein the pre-compensation phase rotator is coupled to the pre-compensation signal generator and also receives a receiver signal x(k) and applies a phase rotation to the receiver signal x(k) based on the pre-compensation phase signal φ.k in order to coarsely compensate the carrier frequency offset Ω contained in the receiver signal x(k).

7. A receiver according to claim 1, wherein the pre-compensation phase rotator is coupled to the pre-compensation signal generator and also receives a receiver signal x(k) and applies a phase rotation to the receiver signal x(k) based on the pre-compensation phase signal φ.k in order to coarsely compensate the carrier frequency offset Ω contained in the receiver signal x(k).

8. A receiver according to claim 1, wherein the loop filter comprises a reset input for resetting the value $\psi(n)$ to zero.

9. A receiver according to claim 8, wherein the pre-compensation estimator comprises a reset output which is coupled to the reset input of the loop filter.

10. A method for carrier frequency offset compensation in spread spectrum receivers for receiving and decoding an input signal r(k) consisting of a sequence of chips, the method comprising the steps of:
applying the input signal r(k) to a correlator which processes the input signal and provides an output signal y(n) which consists of a sequence of symbols;
applying the signal y(n) to a phase rotator which rotates the phase of the signal y(n) based on a filtered phase error signal θ(n) in order to compensate a carrier frequency offset Ω contained in the input signal r(k);
applying the output signal z(n) from the phase rotator to a detector which takes a decision on the symbols and provides an output signal c(n) which is subsequently demapped to a sequence of bits,
applying the output signals of the phase rotator and the detector to an error signal generator which generates a phase error signal e(n) which depends on the carrier frequency offset of the input signal r(k),
applying the phase error signal e(n) to a loop filter which filters the phase error signal e(n) and provides a filtered phase error signal θ(n) which is applied to the phase rotator, and
applying an output signal $\psi(n)$ of the loop filter to a pre-compensation estimator which provides an estimate value φ for the carrier frequency offset Ω.

11. A method according to claim 10, wherein the received signal r(k) passes through the correlator before it passes through the phase rotator.

12. A method according to claim 10, including the step of applying the estimate value φ to a pre-compensation signal generator which generates a pre-compensation phase signal φ.k based on the estimate value φ.

13. A method according to claim 10, including the step of applying a pre-compensation phase signal φ.k to a pre-compensation phase rotator which also receives a receiver signal x(k) and applies a phase rotation to the receiver signal x(k) based on the pre-compensation phase signal φ.k in order to coarsely compensate the carrier frequency offset Ω contained in the receiver signal x(k), whereby the phase rotated receiver signal r(k) is fed to an input of the correlator.

14. A method according to claim 10, wherein at the time when pre-compensation has started, a reset signal is generated in the pre-compensation estimator and applied to the loop filter as to reset the value $\psi(n)$ to zero.

* * * * *